April 22, 1924.  1,491,210
E. P. STEINBACK
POULTRY FEEDING DEVICE
Filed Feb. 19, 1923    2 Sheets—Sheet 1
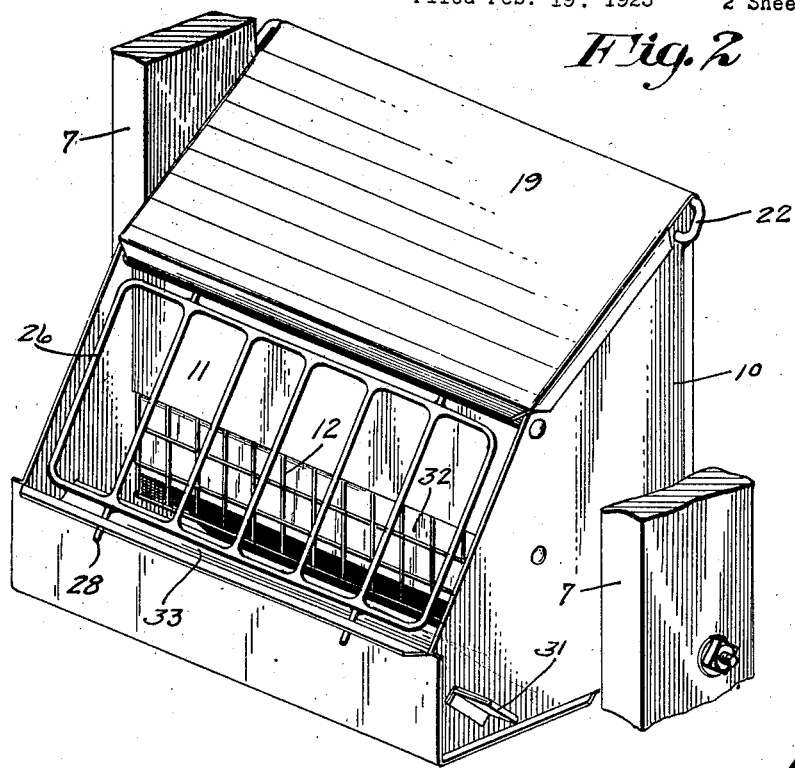
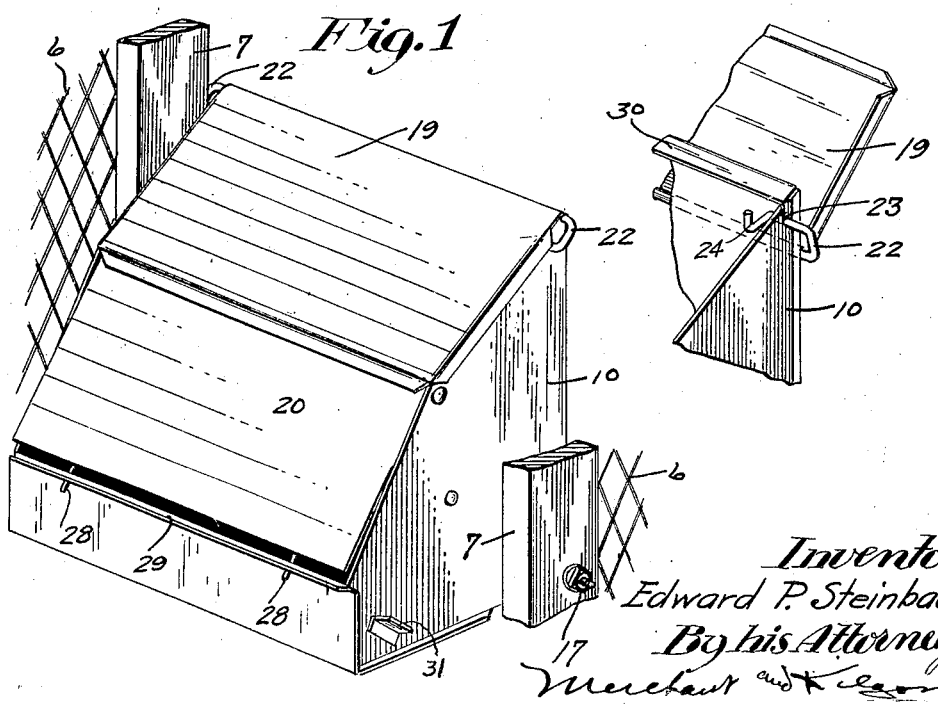
Inventor
Edward P. Steinback
By his Attorneys
Merchant and Kilgore April 22, 1924.

E. P. STEINBACK

POULTRY FEEDING DEVICE

Filed Feb. 19, 1923   2 Sheets-Sheet 2

1,491,210

Inventor
Edward P. Steinback
By his Attorneys

UNITED STATES PATENT OFFICE.

EDWARD P. STEINBACK, OF BLOOMINGTON, MINNESOTA.

POULTRY-FEEDING DEVICE.

Application filed February 19, 1923. Serial No. 619,915.

*To all whom it may concern:*

Be it known that I, EDWARD P. STEINBACK, a citizen of the United States, residing at Bloomington, in the county of Hennepin and State of Minnesota, have invented certain new and useful Improvements in Poultry-Feeding Devices; and I do hereby declare the following to be a full, clear, and exact description of the invention, such as will enable others skilled in the art to which it appertains to make and use the same.

My invention has for its object to provide an extremely simple and highly efficient poultry feeding device, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a perspective view showing both covers of the feeding device closed;

Fig. 2 is a view corresponding to Fig. 1 with the exception that the cover for the feeding compartment is open and folded under the cover of the storage compartment;

Fig. 3 is a fragmentary perspective view of the hinge connection for the cover of the storage compartment;

Figure 5:
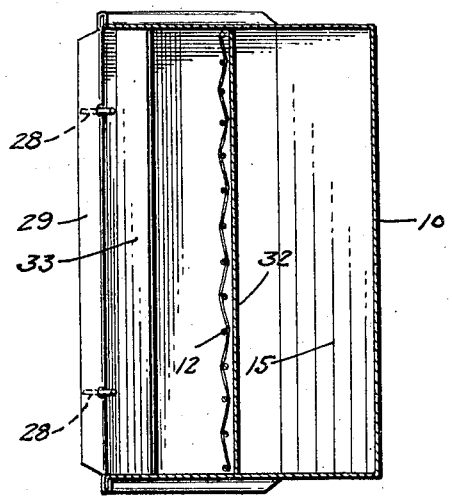
Fig. 5 is a horizontal section taken on the line 5—5 of Fig. 4.

The numeral 6 indicates a partition formed from chicken netting secured, in part, to a pair of laterally spaced uprights 7 cross connected by upper and lower bars 8. The netting 6, between the uprights 7 and the bars 8, is cut away to afford an opening 9 in said partition.

The improved poultry feeding device includes a rectangular box 10 formed from sheet metal, and in which box is secured a transverse upright partition made up of an upper plate 11 and a lower grating 12. This partition 11—12 terminates above the bottom of the box 10 to afford a feed passageway 13, and which partition divides the box into a rear feed storage compartment 14 having a hopper bottom 15 and a front feeding compartment 16 having communication with said feed storage compartment through the grating 12 and the passageway 13. The box 10 is mounted in the opening 9 and attached by a pair of hinge bolts 17 to the uprights 7 for a rearward tilting movement to permit the same to be filled outward of the partition 6. The top of each compartment 14 and 16 is rearwardly inclined and the divergence of the top of the compartment 16 is materially greater than that of the compartment 14. Covers 19 and 20 are provided for the compartments 14 and 16, respectively. The rear edge of the cover 19 is loosely hinged to a swinging hinge rod 21 having, at its ends, arms 22 which terminate in inturned trunnions 23 mounted in aligned bores in the sides of the box 10 at the upper rear corners thereof. Stop fingers 24 are formed with the trunnions 23 and engage the back of the box 10 to limit the upward swinging movement of the hinge rod 21. The upper rear edge of the cover 20 is hinged at 25 to the sides of the plates of the box 10 just above the partition plate 11 and slightly forward thereof.

Extending over the feeding compartment 16 at the inclined top thereof is a grating 26 having laterally spaced bars between which chickens may insert their heads to reach the feed in the feeding compartment 16.

To secure the grating 26 to the box 10, there is formed on the upper and lower horizontal edges thereof retaining fingers 27 and 28, respectively, the former of which extend between the partition plate 11 and hinge joint 25, and the latter of which extend into bores formed in an upturned outwardly inclined flange 29 on the upper edge of the front of the box 10.

When the cover 20 is closed, the same overlies the grate 26, and the width of said cover is such that the same may be opened and folded under the cover 19, and at which time the same is supported on an inturned flange 30 formed with the upper longitudinal edge of the back of the box 10. When the poultry feeding device is in operative position the arms 22 engage the rear edges of the uprights 7 and afford stops to hold said device. Stops 31 on the sides of the box 10 engage the front vertical edges of the uprights 7 when the device is tilted rearward into a filling position as shown by broken lines in Fig. 4. The arrangement of the hinges 17 in respect to the box 10 is such that the said box, when in either of its two extreme positions, is overbalanced and weight thereof holds the box with the respective stops against the uprights 7.

Hinged in the storage compartment 14 is a cut-off leaf 32 which may be turned upward into an inoperative position in which it overlaps the partition plate 11 or turned downward into an operative position in which it overlaps the grating 12 and closes the same to prevent the feed in the compartment 14 from flowing therethrough. Secured within the feeding compartment 16 is a deflecting plate 33 that is rearwardly inclined and has its front edge spaced from the front wall of the box 10 to permit feed thrown thereon by the feeding chickens to be returned to the feeding compartment 16.

Figure 4:
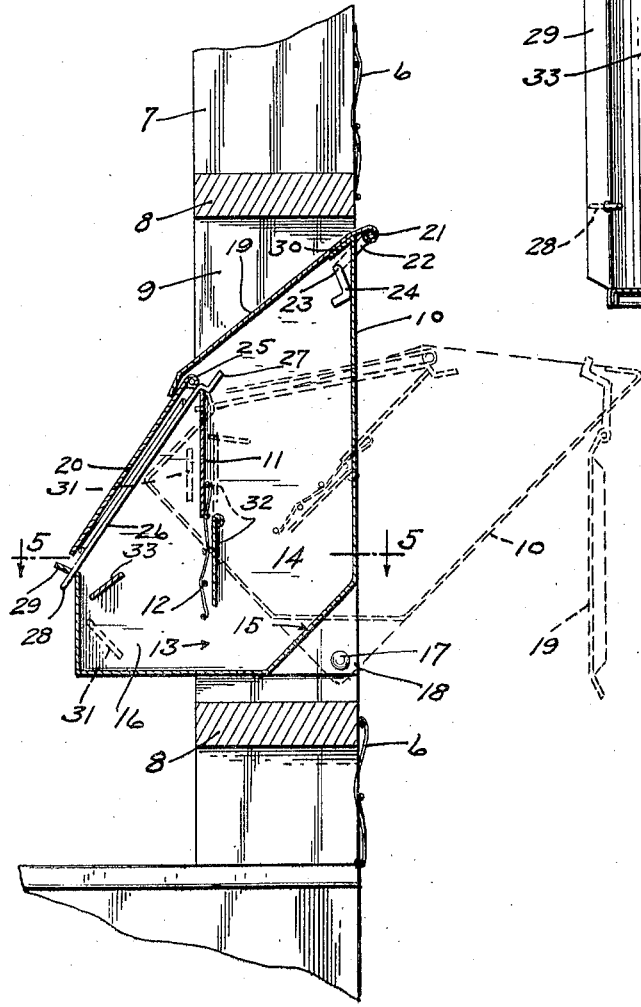
Fig. 4 is a view in central vertical section of the feeding device shown in Fig. 1, and also showing, by means of broken lines, said device moved into a filling position.

To fill the storage compartment 14 with feed, the device is tilted rearward and the cover 19 opened, as shown by broken lines in Fig. 4, and the feed poured into the open top of said storage compartment. The swinging hinge rod 21 permits the cover 19 to hang down so that the same is entirely out of the way, as indicated in Fig. 4, or if desired, said cover may be held horizontally and used as a catch pan to prevent the feed from spilling over onto the floor during the filling of the storage compartment.

When wet feed is placed in the storage compartment 14, the cut-off leaf 32 is turned upward into an inoperative position and frictionally held, as indicated by broken lines in Fig. 4, to permit the wet feed to feed through the grate 12 as well as the passageway 13 into the feeding compartment 16. The reason for thus increasing the passageway between the two compartments is that the wet feed moves very slowly. When dry feed is used the cut-off leaf 32 is turned downward into an operative position, as shown in Fig. 4, to close the grate 12 for the reason that the passageway 13 is sufficiently large to deliver the necessary amount of dry feed, such as grain, from the storage compartment into the feeding compartment. The hopper bottom 15 directs the feed from the storage compartment 14 into the feeding compartment 16. At night, both covers 19 and 20 are closed to keep the feed clean and to prevent rats or other vermin from getting at the feed. During feeding time, the cover 20 is folded under the cover 19 so that the chickens may get at the feed in the feeding compartment 16 through the grating 26.

By mounting the device so that the same may be tilted through the opening 9, it is possible to fill the same without going into the pen and thus disturbing the chickens.

What I claim is:

1. A feeding device comprising a box having a transverse partition terminating above the bottom of the box and dividing the same into a storage compartment and a feeding compartment, a grate extending over the feeding compartment, and a cover for the storage compartment and the feeding compartment independently hinged to the box, the cover for said feeding compartment being arranged when open to extend under the cover for the storage compartment.

2. A feeding device comprising a box having a transverse partition terminating above the bottom of the box and dividing the same into a storage compartment and a feeding compartment, a grate extending over the feeding compartment, and a feed deflector in the feeding compartment at the front wall thereof and spaced therefrom and above the bottom of said compartment.

3. A feeding device comprising a box having a transverse partition terminating above the bottom of the box and dividing the same into a storage compartment and a feeding compartment, the lower portion of the partition being in the form of a grate, and a cut-off leaf arranged to be moved into a position to close said grate.

4. A feeding device comprising a box having a transverse partition terminating above the bottom of the box and dividing the same into a storage compartment and a feeding compartment, the upper portion of the partition being in the form of a plate and the lower portion thereof being in the form of a grate, a cut-off leaf arranged to be moved from a position in which it overlaps the upper portion of the partition into a position in which it overlaps the grate portion of the partition and closes the same.

5. A feeding device comprising a box having a transverse partition terminating above the bottom of the box and dividing the same into a storage compartment and a feeding compartment, a swinging hinge rod pivoted to the box, means for limiting the swinging movement of the hinge rod, and a cover for the feeding compartment loosely hinged to said rod.

6. A feeding device comprising a box having a transverse partition terminating above the bottom of the box and dividing the same into a storage compartment and a feeding compartment, a cover for the storage compartment, a cover hinged to the box in the vicinity of the upper edge of the partition, and a grate having at its lower edge detachable interlocking engagement with the box and also having at its upper edge a part extending between the partition and the cover for the feeding compartment.

7. A feeding device comprising a box having a transverse partition terminating above the bottom of the box and dividing the same into a storage compartment and a feeding compartment, the tops of said two compartments being rearwardly inclined, a grate extending over the feeding compartment, a cover for the storage compartment, and a cover for the feeding compartment arranged when open to extend under the cover for the storage compartment.

8. A feeding device comprising a box having a transverse partition terminating above the bottom of the box and dividing the same into a storage compartment and a feeding compartment, the tops of said two compartments being rearwardly inclined, a grate extending over the feeding compartment, a cover for the storage compartment, a cover for the feeding compartment arranged when open to extend under the cover for the storage compartment, and a transverse outturned flange at the upper edge of the front of the feeding compartment, said grate having at its lower edge retaining fingers extending into apertures in said flange and also having at its upper edge a part extending between the partition and the cover for the feeding compartment.

9. A feeding device comprising a box having a transverse partition terminating above the bottom of the box and dividing the same into a storage compartment and a feeding compartment, the tops of said two compartments being rearwardly inclined, a grate extending over the feeding compartment, a cover for the storage compartment, a cover for the feeding compartment arranged when open to extend under the cover for the storage compartment, a transverse outturned flange at the upper edge of the front of the feeding compartment, said grate having at its lower edge retaining fingers extending into apertures in said flange and also having at its upper edge a part extending between the partition and the cover for the feeding compartment, and a transverse rearwardly inclined deflecting plate in the feeding compartment in the vicinity of said flange and having its lower longitudinal edge spaced from the feeding compartment.

10. The combination with a partition including a pair of uprights, of a feed device including a box mounted between the uprights and hinged thereto at its bottom for rearward tilting movement into a filling position through an opening in the partition, stops for limiting the movement of the box on the hinge, said box having a storage compartment, and a cover for the storage compartment, said cover, when the box is tilted into a filling position, being adapted to be held in a position to afford a catch pan.

In testimony whereof I affix my signature.

EDWARD P. STEINBACK.